United States Patent
Koch et al.

(10) Patent No.: US 9,608,488 B2
(45) Date of Patent: Mar. 28, 2017

(54) STATOR ARRANGEMENT AND ELECTRIC MACHINE

(71) Applicant: Brose Fahrzeugteile GmbH & Co. Kommanditgesellschaft, Würzburg, Würzburg (DE)

(72) Inventors: Kevin Koch, Fürth (DE); Veronique Dillmann, Kitzingen (DE); Christian Martin, Würzburg (DE)

(73) Assignee: Brose Fahrzeugteile GmbH & Co. Kommanditgesellschaft, Würzburg, Würzburg (DE)

(*) Notice: Subject to any disclaimer, the term of this patent is extended or adjusted under 35 U.S.C. 154(b) by 378 days.

(21) Appl. No.: 14/375,482

(22) PCT Filed: Feb. 13, 2013

(86) PCT No.: PCT/EP2013/000414
§ 371 (c)(1),
(2) Date: Jul. 30, 2014

(87) PCT Pub. No.: WO2013/120603
PCT Pub. Date: Aug. 22, 2013

(65) Prior Publication Data
US 2015/0015100 A1    Jan. 15, 2015

(30) Foreign Application Priority Data
Feb. 13, 2012  (DE) .................. 10 2012 202 131

(51) Int. Cl.
*H02K 11/00* (2016.01)
*H02K 3/28* (2006.01)
*H02K 3/52* (2006.01)

(52) U.S. Cl.
CPC .............. *H02K 3/28* (2013.01); *H02K 3/522* (2013.01); *H02K 2203/09* (2013.01)

(58) Field of Classification Search
CPC .................... H02K 2203/09; H02K 3/522
(Continued)

(56) References Cited

U.S. PATENT DOCUMENTS

| | | | |
|---|---|---|---|
| 6,924,570 B2 * | 8/2005 | De Filippis ............ | H02K 3/522 310/260 |
| 7,595,572 B2 * | 9/2009 | Haga ...................... | H02K 3/522 310/194 |

(Continued)

FOREIGN PATENT DOCUMENTS

| | | |
|---|---|---|
| CN | 101034824 A | 9/2007 |
| CN | 102163885 A | 8/2011 |

(Continued)

OTHER PUBLICATIONS

DE Office Action in corresponding DE application No. 102012202131.0 dated Jan. 14, 2013.
(Continued)

*Primary Examiner* — Hanh Nguyen
(74) *Attorney, Agent, or Firm* — Manelli Selter PLLC; Edward J. Stemberger

(57) ABSTRACT

The present invention relates to a stator arrangement for an electric machine, comprising a stator laminate stack, comprising a multiplicity of stator windings, comprising a contact-making device which has at least one contact conductor, which is designed to electrically connect at least two stator windings to one another, wherein a respective contact conductor has at least one connecting lug for electrically coupling an external connection unit to the contact-making device and at least one hook for receiving a winding wire end of a stator winding connected electrically in each case to the contact conductor. The present invention relates to an electric machine comprising such a stator arrangement.

13 Claims, 4 Drawing Sheets

(58) Field of Classification Search
USPC .......................................... 310/71, 214, 215
See application file for complete search history.

(56) References Cited

U.S. PATENT DOCUMENTS

| | | | | |
|---|---|---|---|---|
| 8,546,986 | B2* | 10/2013 | Marchitto | H02K 3/521 310/179 |
| 9,331,539 | B2* | 5/2016 | Arai | H02K 3/522 |
| 2006/0138883 | A1* | 6/2006 | Yagai | H02K 3/522 310/71 |
| 2009/0200879 | A1* | 8/2009 | Ghodsi-Khameneh | H02K 3/28 310/71 |

FOREIGN PATENT DOCUMENTS

| | | |
|---|---|---|
| DE | 19818432 A1 | 11/1998 |
| DE | 102009001830 A1 | 10/2010 |
| DE | 102010033699 A1 | 2/2012 |
| EP | 1526628 A1 | 4/2005 |
| JP | 2011-205877 | 10/2011 |
| KR | 10-1998-0081881 | 11/1998 |
| WO | 2011108735 A1 | 9/2011 |

OTHER PUBLICATIONS

International Search Report in PCT/EP2013/000414 dated Jul. 16, 2014 and English translation thereof.
Office Action and Search Report in Chinese Patent Application No. 201380009149X dated Apr. 5, 2016 and English Translation thereof.
Office Action in Korean Patent Application No. 10-2014-7025118 dated Jan. 13, 2016 and English Translation thereof.

* cited by examiner

STATOR ARRANGEMENT AND ELECTRIC MACHINE

FIELD OF THE INVENTION

The present invention relates to a stator arrangement and to an electric machine, in particular for the automotive sector.

BACKGROUND OF THE INVENTION

Electric machines, for example electric motors, are used for a wide variety of purposes and applications in the automotive sector. By way of example, electric motors are used to drive radiator fan modules. Furthermore, electric motors are also used as drive for the operation of window lifters, belt pretensioners, seat adjusters, external mirrors, electric parking brakes, transmission actuators, oil pumps, for engaging the clutch and switching in a dual clutch transmission, and the like.

Electric motors of this type generally have a stator and a rotor which is rotatably mounted in the stator. The stator usually has a stator core which forms a multiplicity of stator teeth around which stator windings are wound in a known manner. The stator windings wound around the stator teeth generate an electromagnetic field when a current flows through the winding wire, which electromagnetic field, in cooperation with the rotor, causes the latter to rotate.

There are currently a multiplicity of options for connecting the stator windings to contact connections, which are then electrically connected to a connection bushing or an appropriate contact-making device. However, making contact with the winding wire of the stator winding to a multiplicity of individual contacts becomes very difficult and elaborate. The individual contacts must be fixed for this purpose in an insulating end plate or pocket before winding. During the winding process, for example by means of a needle winding or a flyer, a respective wire must be guided into a defined position close to or on the individual contacts in order to then electrically and mechanically connect them together. Furthermore, it is necessary now and then for a plurality of stator windings on the stator teeth to be connected to one another. This connection is usually made via the wire of the individual stator windings and therefore involves disadvantages of a complicated transfer from one stator tooth to an adjacent stator tooth to be connected.

US 2005 088049 A describes a stator for an electric motor which has an annular stator laminated core. An annular connection unit is provided on an end face of the stator core. The connection device has a support structure in which cutouts are formed. Electrically insulated connection rings, which connect individual stator teeth to one another, are provided in said cutouts.

SUMMARY OF THE INVENTION

Against this background, it is an object of the present invention to provide a stator arrangement and an electric machine which enable improved contact to be made with the stator windings.

This object is achieved according to the invention by a stator arrangement having the features of patent claim 1 and by an electric machine having the features of patent claim 10.

Accordingly:

provision is made of a stator arrangement for an electric machine, having a stator laminated core, having a multiplicity of stator windings, having a contact-making device, which has at least one contact conductor, which is designed to electrically connect at least two stator windings to one another, wherein a respective contact conductor has at least one connection lug for electrically coupling an external connection unit to the contact-making device, and at least one hook for receiving a winding wire end of a stator winding which is respectively electrically connected to the contact conductor.

An electric machine is also provided, said machine having a stator arrangement according to the invention and having a rotor arranged and rotatably mounted inside a cylindrical cutout in the stator arrangement.

The concept on which the present invention is based consists in using continuous contact conductors, which in each case connect a plurality of stator windings to one another, instead of connecting each stator winding with a wire and connecting the ends of the wire winding to individual contacts. Said contact conductors have connection lugs for making electrical contact with a connection unit, and hooks in order to accommodate the ends of the wire winding (stator winding) to produce an electrical contact. Owing to the accommodation of the end of the winding wire in a hook such as this, contact can very easily be made with the stator winding. Furthermore, a significantly simplified winding scheme for the entire stator emerges as a result, since the winding wires now no longer have to be laid in a complicated, elaborate and bulky way on one of the end faces of the stator.

The stator arrangement according to the invention can be used in a wide variety of electric machines, for example in generators and motors.

Further advantageous configurations and developments emerge from the further dependent claims and from the description with reference to the figures of the drawing.

In an embodiment of the invention, the hook is formed by virtue of the material of the contact conductor being folded twice. The contact conductor material is first folded once in order to double the thickness of the contact conductor. Subsequently, the contact conductor material is folded a second time in order to form the contour of a hook. In this way, the hook is sufficiently stable to be welded to the wire of the stator winding. Another advantage consists in that the end of a winding wire can also be clamped particularly securely in the hook.

In another advantageous configuration, a respective winding wire end is clamped or laid in a force-fitting manner in a hook associated with the winding wire end. The force-fitting connection is particularly simple since no additional working steps for connecting the wire winding end to the contact conductor are necessary.

During winding on the stator teeth or the tooth-insulating sections, the wire should be guided as horizontally as possible through the breakouts and hooks, as a result of which a slip becomes unlikely. In addition, the hook is not bent axially by the tension of the wire in the event of a horizontal position.

The friction which occurs during the clamping of the wire winding end in the hook is sufficient to fix the winding wire end securely in the hook. Depending on the material and the area of application, the stiffness of the hook can be selected to be greater or smaller. Instead of the force-fitting clamping, it is additionally or alternatively possible to provide a form-fitting and/or firmly bonded connection between the winding wire end and the hook.

In another advantageous configuration of the stator arrangement, the winding wire end is hot-swaged with the hook. In this way, a firmly bonded connection occurs between the winding wire end and the hook. As a result, the winding wire end is fixed in the hook even more securely. The hooks are used in this embodiment merely as positioning aids for the subsequent hot-swaging process. Other options for fixing the winding wire end with the hook, for instance rivets, adhesives, welding, soldering, etc., are obviously also possible and advantageous. In this way, a gas-tight electrical connection can be formed between the winding wire end and the hook.

In another embodiment, the contact conductor has at least two hooks, and preferably precisely 2 hooks, preferably at opposite ends of the respective contact conductor. By means of this configuration, it is possible in a simple manner to electrically connect a plurality of winding wire ends to the contact conductor. In this way, it is also possible for the manufacturing costs to be reduced.

In another embodiment, the hook is preferably formed in one part or in one piece on the connection lug of the contact conductor. In this way, the efficiency of the stator can be increased since the resistance is particularly low owing to the short distance between the connection lug and the winding wire end. The mechanical stability is also increased as a result of this and the hook cannot be ripped off easily.

In another embodiment, the contact-making device has a carrier part for accommodating the contact conductor, which carrier part is formed from a plastics material. Preferably, the carrier part is formed from a glass-fiber reinforced plastic, for example from PA 6.6 GF30. The carrier part is used for the purpose of accommodating, holding and fixing the contact conductor in a preferably form-fitting manner. In addition, the connection lugs are oriented by the carrier part. By means of this configuration, the contact-making device can be designed to be particularly stable and nevertheless very light. Other materials, for instance elastomers, duroplasts, etc., are also possible.

In an advantageous configuration of the invention, the contact conductor is manufactured from sheet metal, preferably from stamped sheet metal. Sheet metal is understood here to mean metal which has a thickness of less than 5 mm, preferably less than 3 mm, and is electrically conductive. By way of example, a steel alloy or an aluminum alloy can be used as sheet-metal material. The contact conductors are preferably stamped out from the sheet-metal material or cut out from the sheet-metal material by means of a laser device. Abrasive water-jet cutting is also possible. Owing to the formation of the contact conductor from sheet metal, the manufacturing costs of the stator arrangement of the electric machine can be significantly reduced.

In a further configuration of the invention, the contact conductor is manufactured from bronze. By way of example, the contact conductor is manufactured from CuSn6. In another preferred configuration, the contact conductor is additionally silver-plated, for example with a silver-plate layer which is 1-3 µm thick and which can be applied to the contact conductor, for example, by galvanization. A nickel pre-plating layer is also possible. By way of example, 2-3 µm of nickel pre-plating can be used for the contact conductor. In this way, the corrosion resistance of the contact conductor is increased. As a result of this, the service life of the stator arrangement can be increased. Other electrically conductive materials are naturally also possible for forming the contact conductor. By way of example, the contact conductor can also be formed from a copper alloy or an iron alloy.

In another embodiment of the invention, the stator laminated core forms a multiplicity of stator teeth on which a multiplicity of stator windings are provided. The stator teeth have grooves in the winding direction of the respective winding wire, which grooves prevent the stator winding from slipping off the respective stator tooth. By way of example, the contact-making device has tooth-insulating sections, which form the upper quarter or the upper half of the stator tooth. The upper quarter of the stator tooth is in this case of semi-circular design. In one embodiment, said upper quarter is provided with grooves which are formed at equal distances in the radial direction on the stator-tooth section of the contact-making device. In addition, on the opposite side of the stator laminated core, an insulating end plate is provided which likewise has tooth-insulating sections, which form the lower quarter or the lower half of a stator tooth. The tooth-insulating sections of the insulating end plate can also be provided with grooves in one embodiment, between which grooves the stator winding is accommodated. When the stator winding is wound, the wire is now held between the grooves in a form-fitting manner, with the result that the stator winding is prevented from slipping from the stator tooth during the winding. In this way, errors are avoided during manufacture of the stator, with the result that fewer rejects are produced.

The above configurations and developments can be combined with one another in any way, provided that it makes sense to do so. Further possible configurations, developments and implementations of the invention comprise combinations—including those which are not explicitly mentioned—of features of the invention described above or in the following text with reference to the exemplary embodiments. In particular, in this case, a person skilled in the art will also include individual aspects to the respective basic form of the present invention as improvement or expansion thereof.

BRIEF DESCRIPTION OF THE FIGURES

The present invention is described in more detail in the following text with reference to the exemplary embodiments specified in the schematic figures of the drawings, in which.

The appended drawings are intended to facilitate further understanding of the embodiments of the invention. They illustrate embodiments and are used in conjunction with the description to explain principles and concepts of the invention. Other embodiments and many of the stated advantages emerge in light of the drawings. The elements of the drawings are not necessarily drawn to scale with respect to one another.

In the figures of the drawings, identical, functionally identical and identically acting elements, features and components are respectively provided with the same reference signs—unless stated otherwise.

DETAILED DESCRIPTION OF EXEMPLARY EMBODIMENTS

Figure 1:
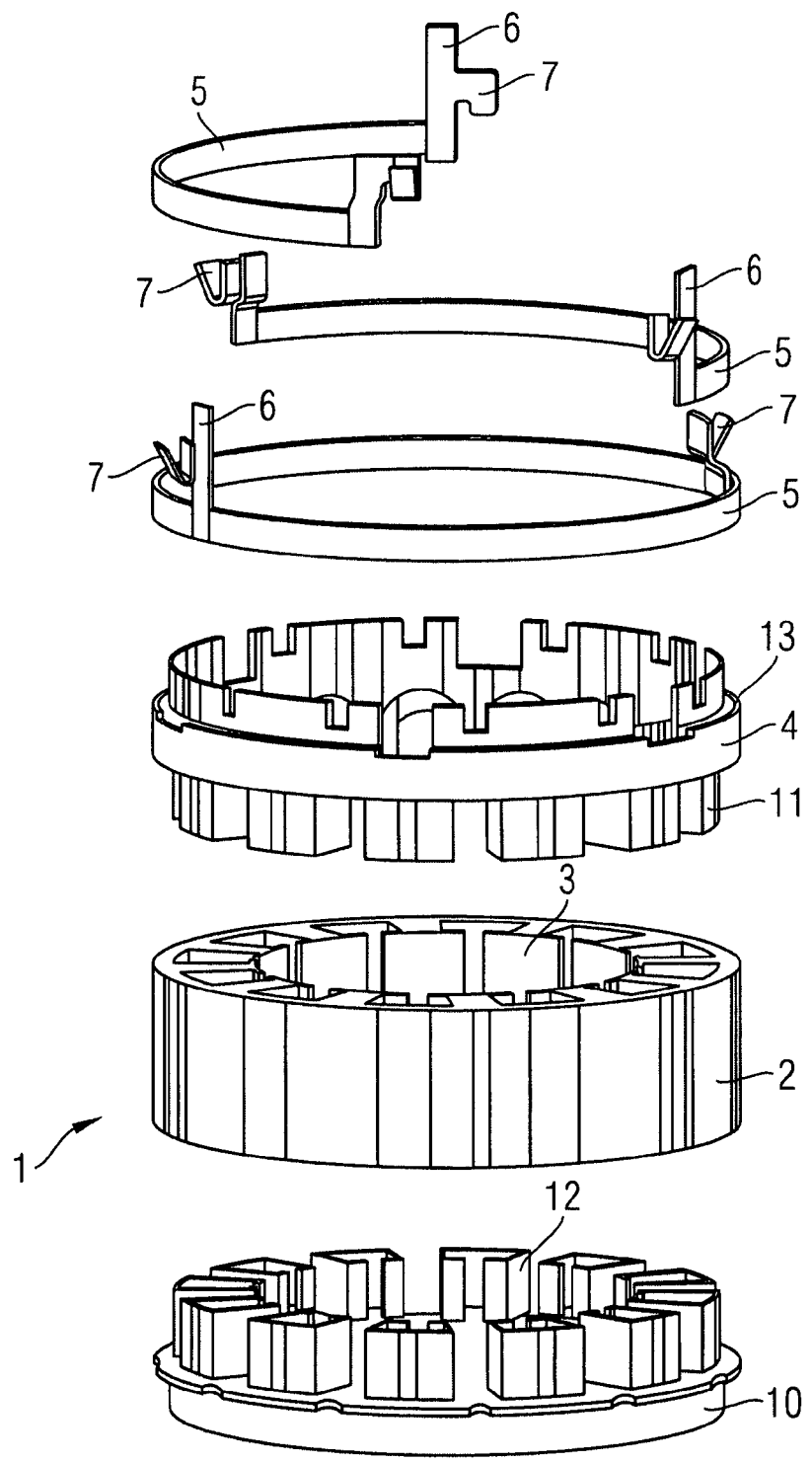
FIG. 1 shows a perspective exploded view of a stator arrangement.

FIG. 1 shows a perspective exploded view of a stator arrangement 1. The stator arrangement 1 is designed for an electric machine, for example an electric three-phase motor or an electric three-phase generator. The stator arrangement 1 has a stator laminated core 2, which has a multiplicity of stator teeth 3. The stator laminated core 2 is formed from a multiplicity of stamped sheet-metal parts which are electrically and mechanically connected to one another. It goes without saying that other configurations of a stator, for example a design in one piece, are also possible.

The stator teeth 3 of the stator laminated core 2 are used to accommodate a stator winding. The stator windings are wound around the stator teeth 3.

A contact-making device 4 is formed by the stator laminated core 2. By way of example, the contact-making device 4 is formed from a plastics material. The contact-making device 4 has tooth-insulating sections 12 which can be connected to corresponding cutouts in the stator laminated core 2 in a form-fitting and force-fitting manner. The contact-making device 4 also has a multiplicity of cutouts 13 which are designed to accommodate the contact conductors 5.

The contact conductors 5 are illustrated above the contact-making device 4. In this embodiment, three contact conductors 5 are accommodated by the accommodation 13 of the contact-making device 4. The contact conductors 5 are formed, for example, from a metal alloy. By way of example, the contact conductors 5 are formed from a bronze alloy. The contact conductors 5 are of semi-circular design.

The contact conductors 5 have in each case connection lugs 6, which are designed to make contact with an external connection unit—not illustrated here. The connection lugs 6 extend in the axial direction of the stator arrangement 1.

Furthermore, the contact conductors 5 have hooks 7 in which the winding wire ends 14 of the stator windings 9 can be inserted and/or clamped. The hooks 7 are preferably formed on the connection lugs 6 of the contact conductors 5 and protrude therefrom. In this embodiment, each contact conductor 5 has in each case two hooks 7. The hooks 7 are arranged laterally on the contact conductors 5 and extend in the radial direction.

Moreover, an insulating end plate 10 is illustrated under the stator laminated core 2, which insulating end plate forms the lower end of the stator arrangement 1. The insulating end plate 10 has tooth-insulating sections 11 which cover and electrically insulate a lower part of the stator teeth and around which the stator winding is wound.

In the illustrated embodiment, three contact conductors 5 are illustrated. Of course, it is possible that more than three or fewer than three contact conductors 5 are used, depending on the area of application and embodiment of the electric machine or the stator arrangement 1.

Figure 2:
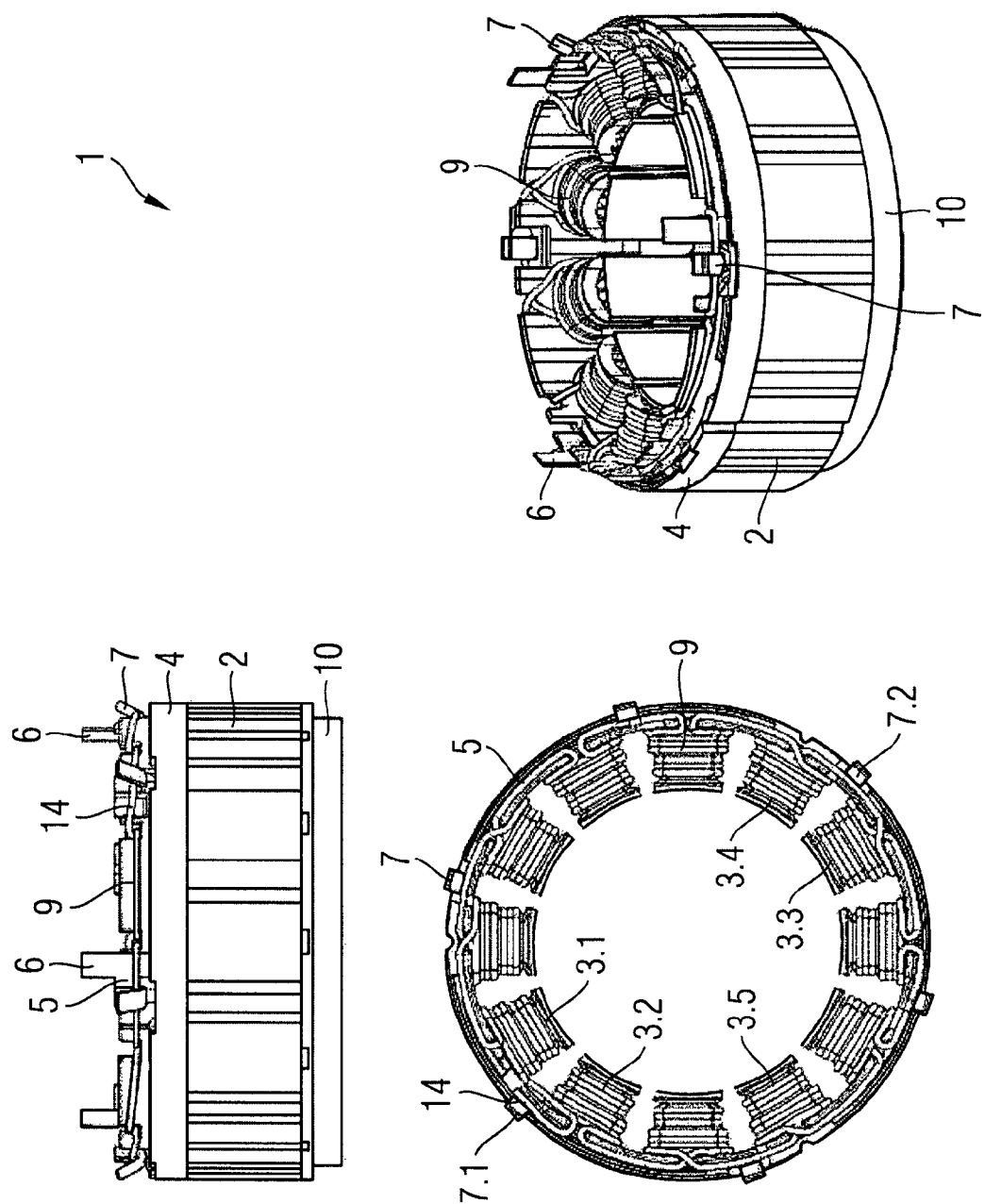
FIG. 2 shows various views of a stator arrangement according to the invention with stator windings.

FIG. 2 illustrates various views of the stator arrangement 1 with stator windings 9. At the top left of FIG. 2, a side view of the stator arrangement 2 is illustrated. At the bottom left, a plan view of the stator arrangement 1 is illustrated. At the bottom right, a perspective view of the stator arrangement 1 is illustrated.

The stator teeth 3 of the stator laminated core 2 are provided with stator windings 9. In the illustrated embodiment, a wire in a single piece is used for the stator windings 9 of the stator teeth 3.1 and 3.2. The winding end 14 of the stator winding 9 is clamped in the hook 7.1 of a contact conductor 5. The stator winding 9 of the stator teeth 3.3 and 3.4 is also formed from a wire in a single piece. The end of said stator windings 9 is clamped in the hook 7.2 of the contact conductor 5. Thus, the stator windings 9 of the stator teeth 3.1, 3.2, 3.3 and 3.4 are electrically coupled to one another. In this way, a very simple interconnection of the stator windings 9 arises, without stator windings 9 crisscrossing multiple times. In this way, the stator windings 9 can be very easily wound around the stator teeth 3. Complicated transfer of the winding wire ends 14 is not necessary. This configuration is particularly suitable for needle windings.

It goes without saying that it is possible to use other configurations of the stator arrangement 1 in an electric machine. By way of example, the contact conductors 5 can have more than two hooks 7.1, 7.2. By way of example, a contact conductor 5 could be designed such that it electrically coupled the stator windings 9 of the stator teeth 3.1, 3.3 and 3.5 to one another. In addition, the number of connection lugs 6 can be matched to the respective area of application or the respective configuration of the electric machine.

In the perspective illustration at the lower right side of FIG. 2 and in the side view of the stator arrangement 1 at the upper left, it can clearly be seen that the winding ends 14 of the stator winding 9 are located in only one plane in the radial direction. Furthermore, this configuration has no crisscrossing of stator windings 9. In this way, the axial extent and the radial extent of the stator arrangement 1 is minimized. As a result of this, damage which occurs, for example, when pressing the stator arrangement 1 into a housing by mechanical pressure on crisscrossed stator windings 9 can be completely avoided.

Figure 3:
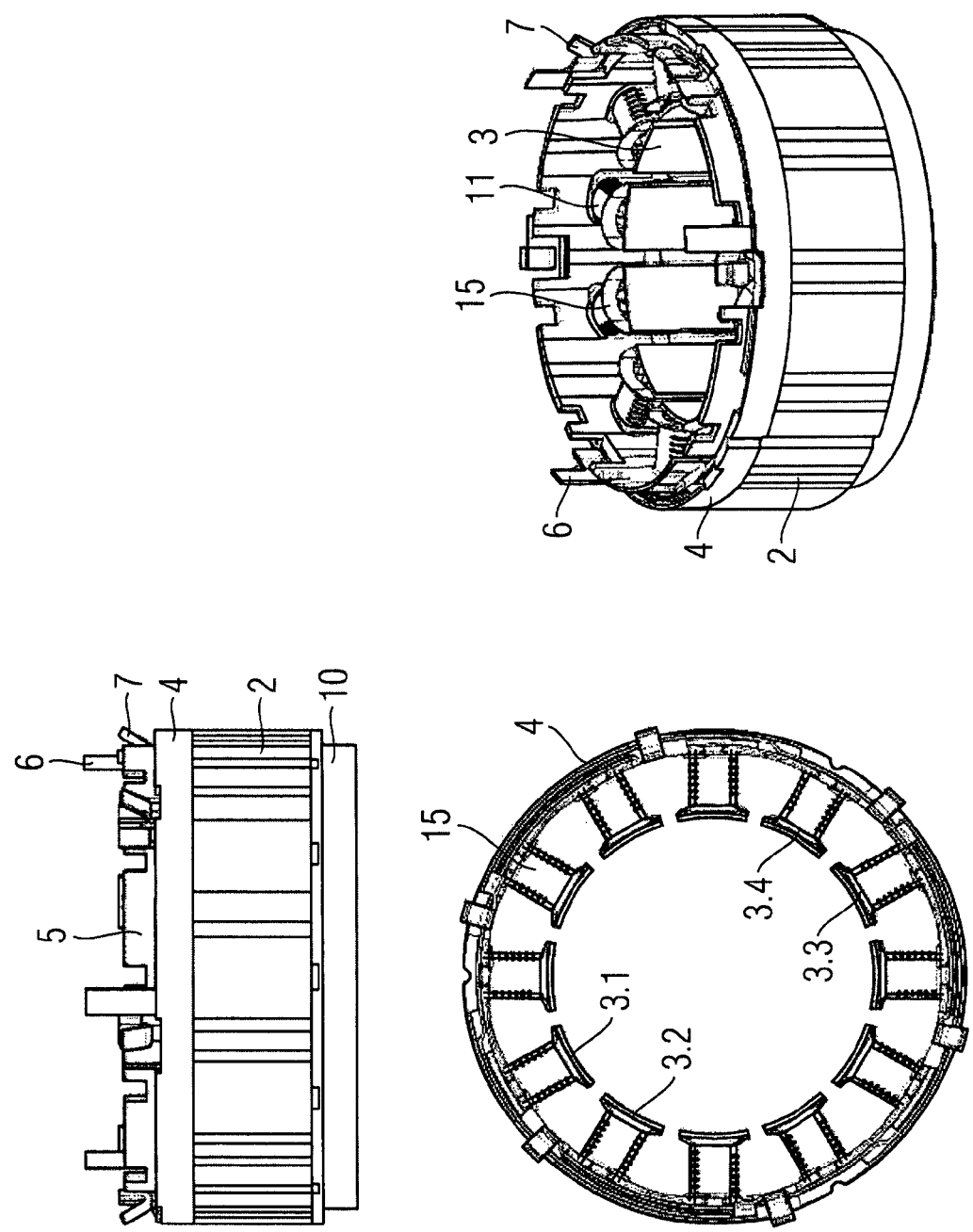
FIG. 3 shows various views of a stator arrangement according to the invention without stator windings.

FIG. 3 illustrates various views of the stator arrangement 1 without stator winding 9. At the upper left in FIG. 3, a side view of the stator arrangement 1 is illustrated. At the lower left, a plan view of the stator arrangement 1 is illustrated. At the lower right, a perspective illustration of the stator arrangement 1 is illustrated.

In the various views in FIG. 3, it can be seen that semi-circular sections 11 are provided on the contact-making device 4. The semi-circular tooth-insulating sections 11 form the upper section of a stator tooth 3 and electrically insulate same. Semi-circular tooth-insulating sections 12 are also formed on the insulating end plate 10—as shown in FIG. 1—which tooth-insulating sections 12 form the lower section of a stator tooth 3 and electrically insulate same. Owing to the semi-circular design of the tooth-insulating sections 11 and 12, the winding can be done very simply. A series of grooves 15 can be provided on both sides of the tooth-insulating sections 11 and 12, by means of which grooves the stator winding 9 can be fixed on the stator teeth 3 during winding. As a result of this, it is avoided that the stator winding 9 slips from the stator tooth 3 during the winding of the stator winding 9.

Figure 4:
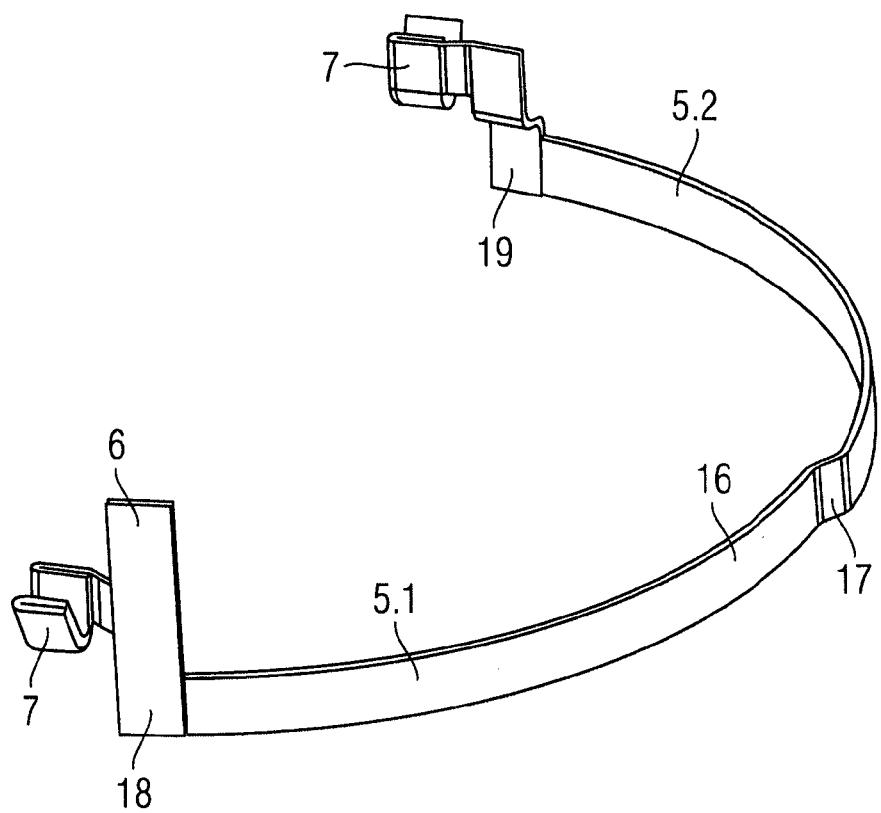
FIG. 4 shows a contact conductor for a stator arrangement according to the invention.

FIG. 4 illustrates a contact conductor 5. The contact conductor 5 is, for example, stamped out from a sheet-metal material and then, in another method step, is reshaped into the desired form, which is illustrated in FIG. 4. The contact conductor 5 has a first central section 5.1 and a second central section 5.2, which adjoin one another at a kink 17. The two central sections 5.1, 5.2 are radially offset with respect to one another by means of the kink 17. The kink 17 is used to provide space for another contact conductor 5. As can be seen in FIGS. 2 and 3, the contact conductors 5 are accommodated in a plane in the cutouts 13 of the contact-making device 4. By virtue of the kink 17, it is possible that the contact conductors 5 are arranged in a plane.

As can be seen in FIG. 4, a connection lug 6 is formed at one end 18 of the contact conductor 5. The connection lug 6 is used to make electrical contact with an external connection unit, which supplies the stator with electrical energy or which draws electrical energy to the stator from the electric motor driven as a generator. A hook 7 is provided laterally on the connection lug 6. The hook 7 is formed by virtue of the contact conductor material being folded twice. The first fold is used to increase the thickness of the contact conductor material and the second fold is used to shape the hook 7. In this way, the thickness of the hook 7 is increased, with the result that said hook is suitable for being connected by welding to the winding end 14 of the stator winding 9. A second hook 7 is provided at the opposite end 19 of the contact conductor 5. This hook 7 is also used to accommodate a corresponding winding wire end 14.

In the illustrated embodiment of the contact conductor 5 in FIG. 4, two hooks 7 and one kink 17 are provided. Of course, it is possible for the contact conductor 5 to have only one hook 7 and no kink 17. Furthermore, it is also possible for the contact conductor 5 to have more than two hooks and more than one kink 17. The number of hooks 7 and the number of kinks 17 can be adapted depending on the area of application and the configuration of the electric machine.

Although the present invention has been fully described above on the basis of preferred exemplary embodiments, the invention is not restricted to said embodiments but can be modified in a variety of ways.

LIST OF REFERENCE SIGNS

1 Stator arrangement
2 Stator laminated core
3 Stator teeth
3.1-3.5 Stator teeth
4 Contact-making device
5 Contact conductor
5.1-5.2 Central sections of the contact conductor
6 Connection lug
7 Hook
7.1, 7.2 Hook
9 Stator winding
10 Insulating end plate
11 Tooth-insulating section
12 Tooth-insulating section
13 Accommodation
14 Wire winding end
15 Grooves
16 Central section
17 Kink
18 First end
19 Second end

The invention claimed is:

1. A stator arrangement (1) for an electric machine, comprising:
a stator laminated core (2),
a multiplicity of stator windings (9), and
a contact-making device (4), which has at least one contact conductor (5), which is manufactured from sheet material and which is constructed and arranged to electrically connect at least two stator windings (9) to one another, wherein a respective contact conductor (5) has at least one connection lug (6) for electrically coupling an external connection unit to the contact-making device (4), and at least one hook (7) for receiving a winding wire end (14) of a stator winding (9) which is respectively electrically connected to the contact conductor (5),
wherein the hook (7) is formed by virtue of the material of the contact conductor (5) being folded, thereby doubling the thickness of the contact conductor, and folded in order to form the contour of a hook.

2. The stator arrangement as claimed in claim 1, wherein a respective winding wire end (14) is clamped in a force-fitting and/or form-fitting manner in a hook (7) assigned to the winding wire end (14).

3. The stator arrangement as claimed in claim 1, wherein the winding wire end (14) is hot-swaged with the hook (7).

4. The stator arrangement as claimed in claim 1, wherein a respective contact conductor (5) has at least two hooks (7).

5. The stator arrangement as claimed in claim 1, wherein the hook (7) is formed on the connection lug (6).

6. The stator arrangement as claimed in claim 1, wherein the contact-making device (4) has a carrier part for accommodating the contact conductor, which carrier part is formed from a plastics material.

7. The stator arrangement as claimed in claim 1, wherein the stator laminated core (2) forms a multiplicity of stator teeth (3) on which the multiplicity of stator windings (9) are provided, wherein the contact-making device (4) and an insulating end plate (10) are provided and cover and insulate the stator teeth by means of tooth-insulating sections (11, 12) formed on the contact-making device (4) and on the insulating end plate (10), wherein the tooth-insulating sections (11) have grooves (15) in the winding direction of the respective winding wire, which grooves prevent the stator winding (9) slipping off the respective stator tooth (3).

8. An electric machine, comprising:
a stator arrangement (1) as claimed in claim 1, and
a rotor arranged and rotatably mounted inside a cylindrical cutout in the stator arrangement (1).

9. The electric machine as claimed in claim 8, wherein a respective winding wire end (14) is clamped in a force-fitting and/or form-fitting manner in the hook (7) assigned to the winding wire end (14).

10. The electric machine as claimed in claim 8, wherein the winding wire end (14) is hot-swaged with the hook (7).

11. The electric machine as claimed in claim 8, wherein a respective contact conductor (5) has at least two hooks (7).

12. The electric machine as claimed in claim 8, wherein the hook (7) is formed on the connection lug (6).

13. The electric machine as claimed in claim 8, wherein the contact-making device (4) has a carrier part for accommodating the contact conductor, which carrier part is formed from a plastics material.

* * * * *